United States Patent [19]

Roth et al.

[11] Patent Number: 4,770,031

[45] Date of Patent: Sep. 13, 1988

[54] ACCELERATED TEST CHAMBER

[75] Inventors: John A. Roth; James J. Steppan; Larry C. Hall; W. Russell Seebaugh, all of Nashville, Tenn.

[73] Assignee: Vanderbilt University, Nashville, Tenn.

[21] Appl. No.: 920,578

[22] Filed: Oct. 17, 1986

[51] Int. Cl.<sup>4</sup> ............................................. G01M 9/00
[52] U.S. Cl. ............................................ 73/147; 73/86
[58] Field of Search ................................... 73/147, 86

[56] References Cited

U.S. PATENT DOCUMENTS 3,327,536 6/1967 Fitzgerald ............................ 73/147

FOREIGN PATENT DOCUMENTS 2522371 12/1976 Fed. Rep. of Germany ........ 73/147

Primary Examiner—Donald O. Woodiel
Attorney, Agent, or Firm—Tilton, Fallon, Lungmus & Chestnut

[57] ABSTRACT

An apparatus for establishing a flow of fluid mass, such as gas, having steady uniform flow at a test section area of the closed loop chamber. The chamber provides a constant and reproducible atmosphere in which the rates of electrolytic metal migration and corrosion can be determined as a function of pollutant concentration and humidity content velocity. The overall length to diameter ratio (L/D) of the chamber is reduced in comparison to conventional chambers.

12 Claims, 1 Drawing Sheet

ACCELERATED TEST CHAMBER

BACKGROUND OF THE INVENTION

This invention relates to an apparatus for establishing a flow of a fluid mass, such as a stream of gas, to serve as a wind tunnel or to predict the actual lifetime and reliability of metal electronic components.

Electrolytic metal migration and corrosion are common reliability problems encountered in the microelectronics industry. Accelerated metal migration and corrosion investigations are performed in test chambers in which the temperature, humidity, pollutant concentration, air velocity, and applied bias can be varied or cycled. Typically, little attention is paid to velocity or concentration profiles as gradients in these chambers. Most accelerated metal migration and corrosion laboratory tests are performed in test chambers which have unknown or uncontrollable velocity and concentration gradients.

Known accelerated test chambers utilized in metal migration and corrosion studies are usually classified as one of three types: (1) flow-through chambers, (a) commercial humidity cabinets, and (3) sealed containers. The flow-through chambers are usually constructed of glass, plastic or poly(tetrafluoroethylene) and best suited for studies using humidified pollutant gases. It is possible, when using a flow-through chamber, to mix humidified air and pollutants in the test chamber. However, this does not provide consistent pollutant and water concentrations in the chamber. Alternatively, the humidified air and pollutant gas streams can be mixed before introduction into the test chamber.

Conventional flow-through chambers are rectangular in shape. Rectangular chambers exhibit velocity gradients, stagnant regions in the corners, and eddy currents at the entrance and exit that may cause nonuniformity of velocity, water vapor and pollutant concentrations.

Reports in the literature indicate that the rates of corrosion of silver, copper and of copper migration are dependent upon the gas velocity past the specimens. However, accelerated test chambers are not standardized, and it is difficult to compare metal migration and corrosion studies performed in different chambers.

Carbone and Corl in "*Atomspheric Corrosion*", W. H. Arbor, Editor, pp. 173–175 John Wiley & Sons, New York (1982), have developed a test to predict metal migration and corrosion. It involves a drop of 400 average molecular weight polyethylene glycol (PEG-400) between a pair of biased electrodes. The PEG film absorbs water and gaseous pollutant species from the ambient environment. These species ionize in the PEG or PEG water film, causing an increase in the electrical conductivity of the film. Copper ions are formed at the anode and migrate to the cathode where they are reduced, producing dendrites. When the dendrites form a continuous filament between the electrodes, the device shorts. The time for the electrode system to short is a measure of the relative rate of metal migration. The metal migration rates for this accelerated test are moderate. The short times are longer than the water drop test, another standardized test, and much shorter than exposing dry electrodes to a temperature-bias-humidity test with or without pollutants. This type of test can be conducted in the accelerated test chamber of the present invention.

According to this invention, an apparatus is provided to distribute uniform quantities of gas so that the apparatus can function as a wind tunnel and to provide a section for establishing uniform gas velocity profiles and pollutant gas concentration profiles to enable the apparatus to function as an accelerated test chamber.

SUMMARY OF THE INVENTION

It is, therefore, an object of the invention to provide an apparatus for establishing gas velocity profiles and pollutant gas concentration profiles in a specified area of the apparatus.

It is another object to provide a wind tunnel.

It is another object to provide an improved apparatus for detecting the rate of electrolytic migration and corrosion of metals.

These and other objects and advantages are achieved through the use of a substantially closed loop chamber having a path therein for the flow of fluid mass or gas, including means to increase the velocity of the fluid mass, a section for exposing materials to be tested in the fluid mass and means for distributing the fluid mass at an uniform flow across the test section.

DETAILED DESCRIPTION

As previously stated, the apparatus of the present invention provides a uniform, reproducible flow of gases at a specific area within the housing for positioning a test device. The uniform, reproducible gas flow can be accomplished by accelerating the flow of gas through short nozzles or by interrupting the flow by a pressure reducing device in the housing a short distance upstream of the test section.

With no intention to be limiting, the description of the invention will be primarily devoted to its use as an accelerated test chamber for electrolytic metal migration and corrosion investigations.

These ooncepts of the invention will be further explained in reference to the drawings.

Figure 1:
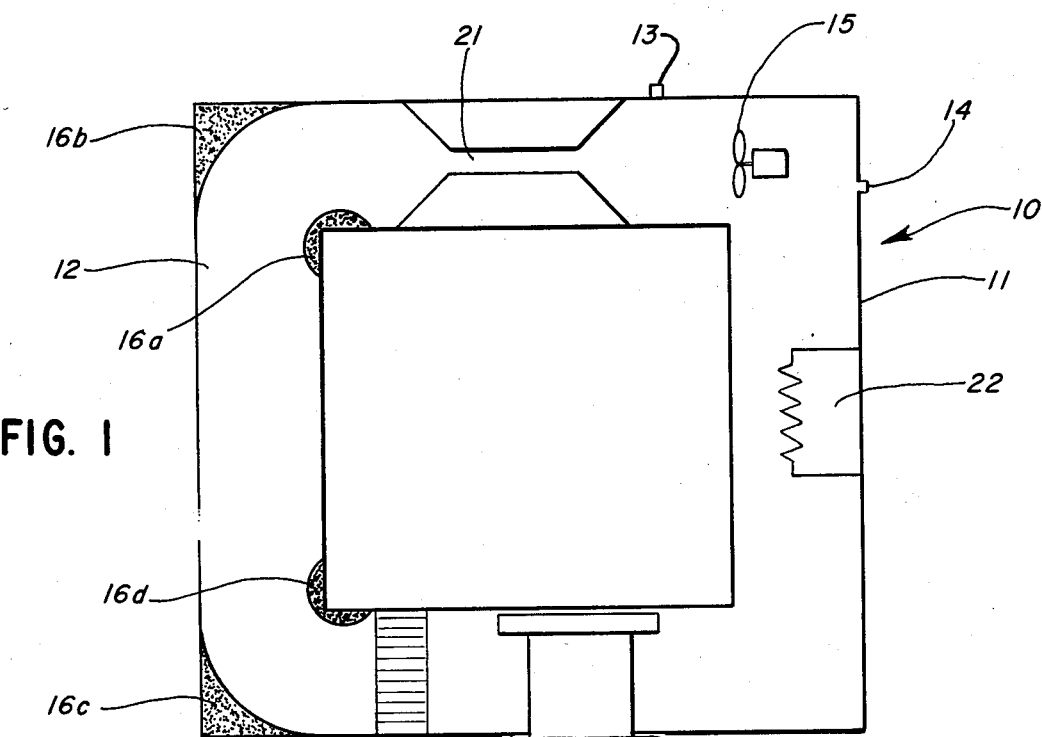
FIG. 1 is a top view of a apparatus which embodies the principles of the instant invention.

Referring now to FIG. 1, the apparatus of the instant invention is generally designated by the numeral 10. The apparatus 10 is supported in any suitable manner at a desired location, employing suitable supporting structure, not designated and includes a generally rectangular housing 11.

The housing 11 defines a continuous path 12 and provides means 16a, 16b, 16c, and 16d to reduce air turbulence within the close looped path. Means 16a–16d are preferably vanes to reduce the formation of eddy currents and air turbulence in the corners of housing 11 upstream from test section 17.

Test section 17, downstream of gas inlet 13 and upstream of gas outlet 14 is an area where uniform velocity profiles of the gas and pollutant concentrations can be measured passing across samples being tested. Samples 18 are placed in drawer 19 for facile movement into and out of path 12 of housing 11.

Adjacent and upstream from test section 17 are means 20 for distributing the gas in a consistent, uniform and reproducible manner across test section 17. Air distributor 20 consists of an array of parallel conduits extending the width and height of the housing at that location and are made from polyethylene or other suitable material. The conduits comprising the air distributor are straight with no flared openings. The tubes are approximately 4 inches long, ¼ inch in outside diameter with a wall thickness of approximately 0.005 inch. The array of polyethylene conduits are enclosed in a screen with mesh size adequate to distribute the gas, preferably a Tyler equivalent mesh size of 14. The screen is made from polyvinyl chloride or other suitable material. The screen assists in developing a uniform velocity profile. The specific arrangement of the conduits in air distributor 20 provide for the uniform profile of air velocity needed for consistent, reproducible studies of aerodynamics or electrolytic metal migration and corrosion. The conduits reduce the volume of air and uniformly increases its velocity for the desired results.

The housing 11 is preferably constructed so that its length to diameter (L/D) ratio is 20. In that regard, the (L/D) of the test section 17 should be 3. For example, if the individual lengths of each of the four walls of housing 11 equal 2.5 ft., the total equals 10 ft., the diameter of one leg of housing 11 being 0.5 ft., therefore, the L/D would equal 20. The test section 17 (L/D), occupies a smaller area of the housing 11. This is not intended to be limiting for many L/D values and structural dimensions may function in the present invention. What is significant however, is that the necessary L/D has been greatly reduced while providing a constant flow and concentration profile across the test device.

Optionally, housing 11 is provided with a throat 21 through which the stream of gas is swept. Throat 21 is provided for placement of instruments for measuring humidity, temperature, pollutant concentration, etc.

Further, housing 11 may be provided with silicone or other inert heating pads or coils 22, and a thermostat (not shown), and may be insulated in order to achieve temperature control. Another alternative is to add a jacket (not shown) to the test chamber to pump heating-/cooling fluid outside the chamber.

OPERATION

It is believed that in view of the foregoing description, the operation of the device will be readily understood. However, it will be briefly described.

With the housing 11 assembled in the manner hereinbefore described, gas inlet 13 is opened to allow entrance of a fluid mass or gas. Fan 15 forces the gas through throat 21 where psychometric measurements are taken. The gas travels in path 12 downstream around vanes 16a-16d into air distributor 20 to be uniformly distributed across test section 17, sample 18 and drawer 19. The gas continues in path 12 wherein about 7% by volume exits housing 11 at gas exit 14.

EXAMPLE I
VELOCITY PROFILE MEASUREMENTS

Figure 3:
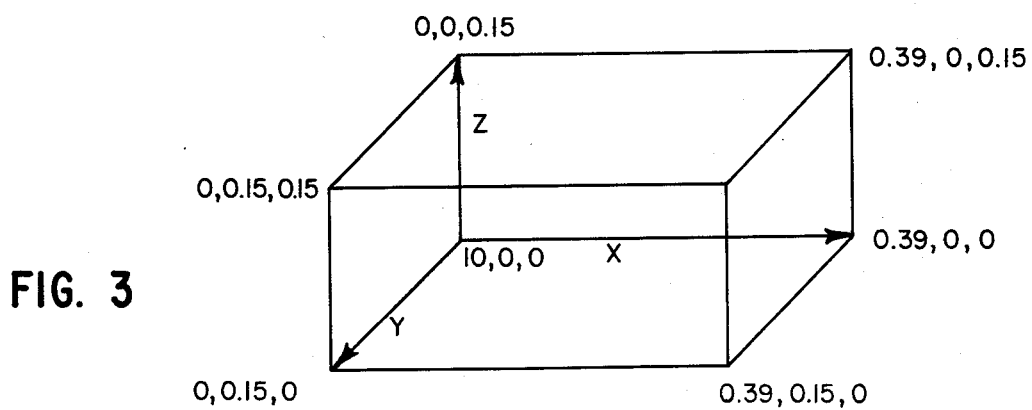
FIG. 3 schematically represents the coordinate system for velocity measurements.

Air velocity measurements were made at multiple locations in the test section with a Flow Corporation Model 55 Air Velocity Meter. The (x,y,z) coordinate system (see FIG. 3) was used to define these locations. The x=0 plane is the x'd side of the air distributor. The air velocity was varied from 0.11 to 2.9 m/s by varying the fan speed. The velocity measurements were taken in the z=0.013, 0.064, and 0.11 planes of the test section.

Graph I shows the velocity profile along the center of the accelerated test chamber and z=0.064 m.

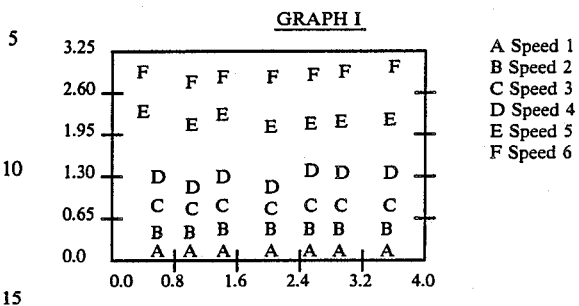

Graph II shows the velocity profiles across the chamber at the same height.

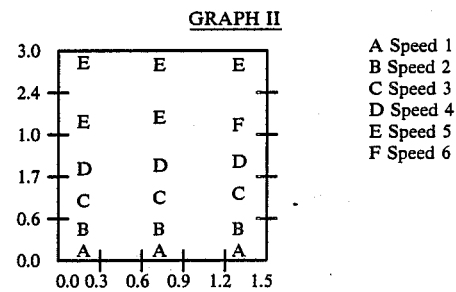

The mean velocity values and their standard deviations appear in following Table 1.

TABLE 1

| Mean Velocity (m/s) | Standard Deviation (m/s) |
| --- | --- |
| z = 0.013 m plane (z = 0.051–0.36 m; y = 0.025–0.13 m) | |
| 0.13 | 0.016 |
| 0.38 | 0.0060 |
| 0.81 | 0.035 |
| 1.2 | 0.092 |
| 2.1 | 0.079 |
| 2.9 | 0.16 |
| z = 0.064 m plane (x = 0.051–0.36 m; y = 0.025–0.13 m) | |
| 0.11 | 0.0083 |
| 0.36 | 0.014 |
| 0.75 | 0.030 |
| 1.1 | 0.092 |
| 2.0 | 0.056 |
| 2.8 | 0.081 |
| z = 0.11 m plane (x = 0.051–0.36 m; y = 0.025–0.13 m) | |
| 0.11 | 0.012 |
| 0.36 | 0.018 |
| 0.72 | 0.022 |
| 1.0 | 0.030 |
| 1.9 | 0.056 |
| 2.6 | 0.060 |
| x = 0.30 m plane (y = 0.0039–0.055 m; z = 0,013–0.11 m) | |
| 0.11 | 0.0037 |
| 0.36 | 0.012 |
| 0.72 | 0.036 |
| 1.0 | 0.10 |
| 1.9 | 0.082 |
| 2.6 | 0.093 |

The velocity profile results show no organized patterns, but some scatter in the transverse and longitudinal directions in the test section of the accelerated test chamber. The range of standard deviations (m/s) in the test section was 0.0037–0.16 at mean velocities of 0.11–2.9 m/s, respectively.

Figure 2:
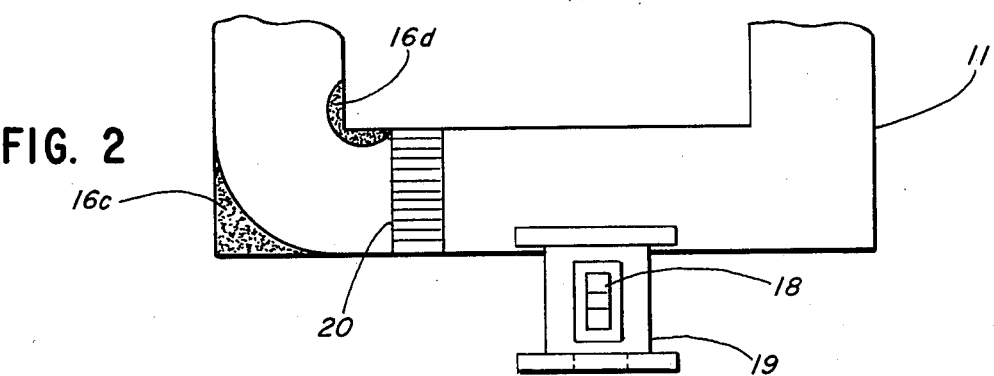
FIG. 2 is a top view showing the extended drawer containing substrate connector for insertion into the apparatus.

The introduction of test specimens and electrical connections disturb the velocity profile downwind of the samples. Thus, it is important to design a sample holder with a small cross-sectional area, as shown in FIG. 2. The sample holder used in this test held two test specimens. Both specimens have identical velocity profiles across them.

EXAMPLE 2

Concentration Profile Methods

A Matheson Certified Standard gas mixture of 102 ppm (vol.) $SO_2$ in air was introduced into the accelerated test chamber with the fan creating a velocity of approximately 1.0 m/s. Gas samples ($5.0 \times 10^{-7} M^3$) were taken from locations in the test section after steady state was reached (approximately 1800 s). The $SO_2$ concentrations were determined with a Tracor Model 565 gas chromatograph equipped with a Hall 700A electrolytic conductivity detector. Gas samples were taken in the z=0.11 plane to determine the horizontal concentration gradient, if any. Samples were also taken at x=0.30, y=0.076, z=0.025, 0.091, and 0.11 to determine vertical concentration gradients. Gas samples take directly from the Matheson cylinder were used as standards for comparison with samples taken from the accelerated test chamber.

Replicate samples of Standard 102 ppm (vol.) $SO_2$-air mixture were analyzed by gas chromotography with a maximum standard deviation of 1.1 ppm. The standard deviation of the vertical point concentration analyses in the test section was 1.2 ppm. Similarly, the standard deviation of the horizontal point concentration analyses was 1.0 ppm. The concentration profile results show that there are minimal horizontal and vertical concentration gradients in the test section. With these results, the effects of velocity, humidity, and pollutant concentration upon the rate of metal migration or corrosion can be investigated singly or in combination.

As can be seen, the apparatus 10 may function as a wind tunnel or test chamber. Although the invention has been herein shown and described in what is conceived to be the most practical and preferrred embodiment, it is recognized that departures may be made therefrom within the scope of the invention, which is not to be limited to the illustrative details disclosed.

We claim:

1. An apparatus for establishing a stream of fluid mass having a uniform flow at a test area comprising
    a. a substantially closed loop chamber providing a path therewithin for controlling the flow of body of selected fluid mass
    b. fluid mass entrance and exit means communicating with said chamber closed loop
    c. means for increasing the velocity of the fluid mass in said closed loop chamber
    d. a test section in said closed loop chamber downstream from said fluid mass entrance and upstream from said fluid mass exit which includes means for accelerating and restricting air flow
    e. means for distributing the fluid mass at an uniform flow across the test section comprising a series of conduits positioned to receive and distribute said fluid mass in the direction of flow of said mass enclosed in a screen extending the width and height of a cross section of the closed loop in the test section upstream of the means for holding a sample.

2. The apparatus of claim 1 wherein said test section includes means for inserting and withdrawing a sample to be tested into or from the test section of said closed loop chamber.

3. The apparatus of claim 1 wherein said means for distributing the fluid mass comprises an array of straight tubes about 4 inches long with an outside diameter of about 0.25 inches and a wall thickness of 0.005 inches enclosed in a screen.

4. The apparatus of claim 3 having an enclosed screen with a mesh size of Tyler 14.

5. The apparatus of claim 1 wherein the length to diameter ratio (L/D) of the chamber is substantially reduced in comparison to conventional chambers.

6. The apparatus of claim 1 wherein the length to diameter ratio (L/D) of the chamber is about 20 and the (L/D) of the test section is about 3.

7. The apparatus of claim 1 wherein said chamber is equipped with means for reducing air turbulance within said closed loop path.

8. The apparatus of claim 7 in which said chamber includes generally rectangular housing, said entrance, exit and velocity increasing means being adjacent first housing corner, the two corners downstream of said first corner being equipped with vanes to reduce air turbulance, said test section being positioned between the third and former corners.

9. The apparatus of claim 1 wherein the apparatus is utilized for detecting the rate of electrolyte migration and corrosion of metals.

10. Apparatus for providing a uniform gas flow past a testing site comprising path providing means including in series: gas inlet equipped fan means, a stacked array of tubes positioned to receive and distribute said gas flow enclosed in a screen, a test site and a gas exit, said tube array being operative to increase gas velocity.

11. The apparatus of claim 10 having means to heat said gas.

12. The apparatus of claim 10 having a jacket surrounding said apparatus through which heating/cooling fluid is pumped.

* * * * *